United States Patent [19]

Blomgren et al.

[11] 3,953,235

[45] Apr. 27, 1976

[54] NONAQUEOUS CELL HAVING AN ELECTROLYTE CONTAINING CROTONITRILE

[75] Inventors: George E. Blomgren, Lakewood, Ohio; Gerald H. Newman, Westfield, N.J.

[73] Assignee: Union Carbide Corporation, New York, N.Y.

[22] Filed: Dec. 23, 1974

[21] Appl. No.: 535,716

[52] U.S. Cl. .................................. 136/20; 136/23; 136/25; 136/26; 136/28; 136/155
[51] Int. Cl.² ........................................... H01M 4/36
[58] Field of Search ............... 136/20, 6 LN, 100 R, 136/154, 155

[56] References Cited
UNITED STATES PATENTS

| | | | |
|---|---|---|---|
| 3,514,337 | 5/1970 | Braeuer | 136/155 X |
| 3,567,515 | 3/1971 | Marick et al. | 136/6 |
| 3,639,174 | 2/1972 | Kegelman | 136/6 LN |
| 3,773,558 | 11/1973 | Charbonnier et al. | 136/6 LN |
| 3,796,604 | 3/1974 | Gabano et al. | 136/6 LN |
| 3,796,605 | 3/1974 | Dechenaux et al. | 136/6 LN |
| 3,806,369 | 4/1974 | Dey et al. | 136/6 LN |

OTHER PUBLICATIONS

J. Electrochemical Soc., Vol. 117, No. 3, Mar. 1970, "Kinetics of the Solid Lithium Electrode" pp. 295–299.
ECOM, Research & Development Report, Sept. 1967, ESB Inc. Research Center.

Primary Examiner—John H. Mack
Assistant Examiner—C. F. Lefevour
Attorney, Agent, or Firm—Cornelius F. O'Brien

[57] ABSTRACT

A nonaqueous cell utilizing a highly active metal anode, such as lithium, a solid cathode, such as $(CF_x)_n$, copper sulfide or the like, and a liquid organic electrolyte consisting essentially of crotonitrile in combination with a protective cosolvent, preferably propylene carbonate, and an ionizable solute, such as $LiClO_4$.

10 Claims, No Drawings

NONAQUEOUS CELL HAVING AN ELECTROLYTE CONTAINING CROTONITRILE

FIELD OF THE INVENTION

This invention relates to a nonaqueous cell utilizing a highly active metal anode, a solid cathode and a liquid organic electrolyte consisting essentially of crotonitrile in combination with a protective type cosolvent and a selected solute.

BACKGROUND OF THE INVENTION

The development of high energy battery systems requires the compatibility of an electrolyte possessing desirable electrochemical properties with highly active anode materials, such as lithium, calcium, sodium and the like, and the efficient use of high energy density cathode materials, such as fluorinated carbon, copper sulfide and the like. The use of aqueous electrolytes is precluded in these systems since the anode materials are sufficiently active to react with water chemically. It has, therefore, been necessary, in order to realize the high energy density obtainable through use of these highly reactive anodes and high energy density cathodes, to turn to the investigation of nonaqueous electrolyte systems and more particularly to nonaqueous organic electrolyte systems.

The term "nonaqueous organic electrolyte" in the prior art refers to an electrolyte which is composed of a solute, for example, a salt or complex salt of Group I-A, Group II-A or Group III-A elements of the Periodic Table, dissolved in an appropriate nonaqueous organic solvent. Conventional solvents include propylene carbonate, ethylene carbonate or γ-butyrolactone, or the like. The term "Periodic Table" as used herein refers to the Periodic Table of the Elements as set forth on the inside back cover of the Handbook of Chemistry and Physics, 48th Edition, The Chemical Rubber Co., Cleveland, Ohio, 1967–1968.

A multitude of solvents is known and recommended for use but the selection of a suitable solvent has been particularly troublesome since many of the solvents which can be used to prepare electrolytes sufficiently conductive to permit effective ion migration through the solution are reactive with the highly reactive anodes described above. Consequently, many investigators in search of suitable solvents have concentrated on aliphatic and aromatic nitrogen- and oxygen-containing compounds with some attention given to organic sulfur-, phosphorus- and arsenic-containing compounds. The results of this search have not been entirely satisfactory since many of the solvents investigated still could not be used effectively with extremely high energy density cathode materials, such as fluorinated carbon, and were sufficiently corrosive to lithium anodes to prevent efficient performance over any length of time.

U.S. Pat. No. 3,547,703 to Blomgren et al discloses the use of a nonaqueous battery electrolyte employing a solute dissolved in ethylene glycol sulfite. U.S. Pat. Nos. 3,536,532 and 3,700,502 disclose nonaqueous cells employing solid fluorinated carbon $[(CF_x)_n]$ as the active cathode material in conjunction with a light metal anode and a conventional nonaqueous electrolyte.

French Pat. No. 2,124,388 discloses a nonaqueous electrolyte using dioxolane as the solvent.

U.S. application Ser. No. 509,820 now U.S. Pat. No. 3,907,597 by G. W. Mellors discloses a nonaqueous electrolyte comprising sulfolane or its liquid alkyl-substituted derivatives in combination with a low viscosity cosolvent and an ionizable solute. Another U.S. application Ser. No. 462,792 now U.S. Pat. No. 3,871,916 by M. L. Kronenberg discloses a nonaqueous electrolyte based on 3-methyl-2-oxazolidone in combination with a low viscosity solvent and an ionizable solute.

U.S. Pat. No. 3,567,515 to Maricle et al discloses a nonaqueous cell system wherein sulfur dioxide is employed to form what is referred to as a "passivating" film on a highly active metal, such as lithium, said film being some form of metal-sulfur dioxide complex or reaction product which prevents substantial further attack of sulfur dioxide on the metal. In a similar manner, an article titled "Kinetics of the Solid Lithium Electrode in Propylene Carbonate" appearing in the J. Electrochemical Society, Vol. 117, No. 3, Mar. 1970, discloses that propylene carbonate may form a film on lithium metal through the reaction between the lithium and the propylene carbonate.

A Final Report dated Sept., 1967 under a Contract No. DA-28-043-AMC-02304 (E) USAECOM discloses the use of propylene carbonate as a good solvent for use in nonaqueous cells along with the listing of many other possible solvents. Crotonitrile is listed as a possible solvent; however, it was found that when it was in contact with lithium, the rate of corrosion of lithium was excessive. Therefore, crotonitrile was not pursued as a solvent having comparable properties to propylene carbonate.

It is thus known in the art that while the theoretical energy, i.e., the electrical energy potentially available from a selected anode-cathode couple, is relatively easy to calculate, there is a need to choose a nonaqueous electrolyte for such couple that permits the actual energy produced by an assembled battery to approach the theoretical energy. The problem usually encountered is that it is practically impossible to predict in advance how well, if at all, a nonaqueous electrolyte will function with a selected couple. Thus a cell must be considered as a unit having three parts, a cathode, an anode and an electrolyte, and it is to be understood that the parts of one cell are not predictably interchangeable with parts of another cell to produce an efficient and workable cell.

It is an object of the present invention to provide a nonaqueous cell employing among other components a liquid organic electrolyte consisting essentially of crotonitrile in combination with a protective cosolvent and a solute.

It is a further object of the present invention to provide a nonaqueous cell which utilizes a highly active metal anode, such as lithium, a solid cathode such as $(CF_x)_n$, copper sulfide, copper oxide, nickel fluoride or silver chloride, and a liquid organic electrolyte comprising crotonitrile in combination with a protective cosolvent and a solute.

It is a further object of the invention to provide an electrolyte solvent system for nonaqueous solid cathode cells consisting essentially of crotonitrile in combination with a protective cosolvent, a low viscosity cosolvent and a solute.

It is a further object of this invention to provide a nonaqueous cell which utilizes a metal anode, a solid cathode and a liquid organic electrolyte based on crotonitrile in combination with a protective cosolvent such as propylene carbonate and a solute such as LiClO$_4$.

SUMMARY OF THE INVENTION

This invention provides a novel high energy density nonaqueous cell comprising a highly active metal anode, a solid cathode and a liquid organic electrolyte consisting essentially of crotonitrile, a protective cosolvent and an ionizable solute. If the viscosity of the protective cosolvent is of a magnitude that it decreases the solution conductivity of the electrolyte below $10^{-4}$ ohm$^{-1}$ cm$^{-1}$, then a low viscosity cosolvent must be added along with the protective cosolvent to insure that the electrolyte conductivity will be at least about $10^{-4}$ ohm$^{-1}$ cm$^{-1}$.

As used herein, a protective cosolvent shall mean at least one cosolvent which when mixed with crotonitrile and an ionizable solute to form a liquid electrolyte for use in a highy active-anode nonaqueous cell, the cosolvent will effectively form a protective barrier for protecting a highly active metal anode of the cell against excessive corrosion by crotonitrile, so that chemical or physical interaction between the anode metal and the electrolyte solution is substantially prevented.

An essential component of the liquid electrolyte of this invention is crotonitrile which has the properties shown in Table 1. Crotonitrile is also known or has been referred to as crotononitrile.

TABLE 1

| | |
|---|---|
| Molecular Weight | 67.09 |
| Melting Point | −51.1° C |
| Boiling Point | 120° C |
| Density (20° C) | 0.8239 g/cm$^3$ |
| Dielectric Constant (20° C) | 28.1 |
| Viscosity (25° C) | ~0.476 centipoise. |

An ionizable solute of LiClO$_4$ mixed in various concentrations in crotonitrile exhibited the laboratory measured properties shown in Table 2.

TABLE 2

| Concentration LiClO$_4$ (Moles/liter) | Specific Conductivity (Ohm$^{-1}$ cm$^{-1}$) | Density (g/cm$^3$) | Viscosity (Centipoise) |
|---|---|---|---|
| 0.5 | 8.832 × 10$^{-3}$ | 0.847 | 0.610 |
| 1.0 | 11.260 × 10$^{-3}$ | 0.883 | 0.886 |
| 2.0 | 11.400 × 10$^{-3}$ | 0.908 | 2.170 |

When a crotonitrile-LiClO$_4$ electrolyte was used in a lithium anode cell, a chemical reaction occurred between crotonitrile and the unprotected highly active lithium anode. This undesirable reaction continued until polymerization of the crotonitrile occured which resulted in progressive thickening of the electrolyte until finally a solid was formed.

Thus, although the measured solution conductivity and viscosity appeared to indicate that crotonitrile in combination with an ionizable solute would be a suitable electrolyte for nonaqueous cells using highly active metal anodes, the opposite was observed.

Although not wanting to be bound by theory, it is thought that the following reaction occurs between a highly active surface such as lithium and liquid crotonitrile solvent:

(1)    Li + CH$_3$CH=CHCN → CH$_3$CH—CHCN⊖ + Li$^+$ (+ additional CH$_3$CH=CHCN to form polymer)

The crotonitrile radical ion (indicated by ⊖) then reacts with other crotonitrile molecules in an anionic polymerization process to produce a polymer of progressively increasing molecular weight until finally a solid is formed. This process continues even after the lithium has been completely consumed so long as there are additional crotonitrile molecules present and there is no other material present in the system which could terminate the reaction.

According to this invention, crotonitrile can be successfully employed in nonaqueous cells employing highly active metal anodes if a protective cosolvent is added in conjunction with the crotonitrile. An example of a good protective cosolvent is propylene carbonate. It is believed that when lithium is contacted with the protective cosolvent propylene carbonate, the following reaction occurs to a limited extent so as to effectively form a thin protective barrier on the lithium surface:

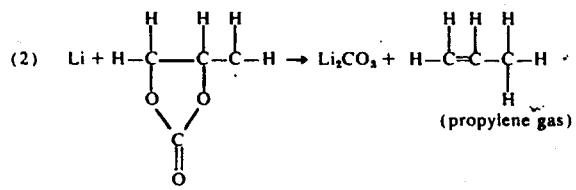

When propylene carbonate is mixed with crotonitrile, and an ionizable solute (e.g., a metal salt such as LiClO$_4$) is present, reaction (2) above takes precedence, and the crotonitrile polymerization does not occur. It is deemed essential that the solute be present in order for the solution conductivity to be high enough for reaction (2) (actually believed to be a corrosion reaction) to occur at a sufficiently rapid rate to prevent reaction (1) from being initiated. If there is no solute present, reaction (1) will occur in spite of the presence of propylene carbonate. Effective concentration ranges of the protective cosolvents, such as propylent carbonate, are from about 1 to 50 volume per cent of the solvent mixture, preferably from about 4 to 30 volume per cent of the solvent mixture so that a sufficient concentration of the protective cosolvent will be available in the solution for reaction (2) to occur at a sufficiently rapid rate to prevent reaction (1) from being initiated.

It is believed that a concentration of the protective cosolvent lower than 1 volume per cent of the solvent mixture would be ineffective to adequately provide a protective barrier for the metal and to sufficiently inhibit the undesirable chemical and/or physical reactions from occurring between the crotonitrile and the metal anode. Protective cosolvent concentrations higher than 50 volume per cent of the solvent mixture would counteract the beneficial effects of crotonitrile in permitting cathodic discharges of high efficiencies at higher discharge rates. In the case of propylene carbonate, since it is a rather viscous material, concentrations above about 30 volume per cent of the solvent mixture would tend to reduce the solution conductivity of the electrolyte thereby diminishing the cell's high rate capability because of the reduced conductivity. This could be counteracted by adding a low viscosity cosolvent so as to maintain the viscosity of the solution at least below about 5 centipoise.

Other suitable protective cosolvents include ethylene carbonate, γ-butyrolactone, nitrobenzene, methyl acetate, methyl formate, dimethyl sulfoxide, propylene glycol sulfite, diethyl sulfite, sulfolane, 3-methyl sulfolane, and the like.

Suitable low viscosity cosolvents for use in this invention include tetrahydrofuran (THF), dioxolane, dimethoxyethane (DME), dimethyl isoxazole (DMI), dioxane, or the like.

The low viscosity cosolvent, if required, should be added so as to lower the viscosity of the electrolyte to a level suitable for use in a cell, said level being generally less than about 5 centipoise at 30°C, preferably less than about 3.

Highly active metal anodes suitable for this invention include lithium (Li), sodium (Na), potassium (K), calcium (Ca), magnesium (Mg) and their alloys. Of these active metals, lithium would be preferred because in addition to being a ductile, soft metal that can easily be assembled in a cell, it possesses the highest energy-to-weight ratio of the group of suitable anode metals. When sulfolane or its alkyl-substituted derivatives are employed as the protective cosolvent, sodium anodes are not desirable because they react with these protective cosolvents.

Cathodes for use in this invention are the solid electrodes which include fluorinated carbon represented by the formula $(CF_x)_n$ wherein $x$ varies between about 0.5 and about 1.2 and wherein n refers to the number of monomer units which can vary widely, copper sulfide (CuS), nickel fluoride ($NiF_2$), copper oxide (CuO), manganese dioxide ($MnO_2$), lead dioxide ($PbO_2$), iron sulfide ($FeS_2$), copper chloride ($CuCl_2$), silver chloride (AgCl), sulfur (S), and the like. The $(CF_x)_n$ electrodes are composed of carbon and fluorine, said carbon including graphitic and non-graphitic forms of carbon, such as coke, charcoal or active carbon. As disclosed in U.S. Pat. Nos. 3,536,532 and 3,700,502, solid fluorinated carbon electrodes are extremely stable and resistive to chemicals over the range of values of $x$ from 0 to about 1. Preferably, $(CF_x)_n$ cathodes wherein $x$ varies between about 0.8 and about 1.1 would be admirably suited for use with the specific electrolyte of the invention because this range represents the best available energy density of the cathode materials.

The ionizable solute for use in this invention may be a simple salt ($LiClO_4$) or double salt or mixtures thereof, which will produce an ionically conductive solution when dissolved in one or more solvents. Suitable solutes are complexes or inorganic or organic Lewis acids and inorganic ionizable salts. One of the requirements for utility is that the salts, whether simple or complex, be compatible with crotonitrile and the cosolvent(s) being employed and that they yield a solution which is sufficiently ionically conductive, e.g., at least about $10^{-4}$ ohm$^{-1}$ cm$^{-1}$. Generally, an amount of at least about 0.5 M (moles/liter) would be sufficient for most cell applications.

According to the Lewis or electronic concept of acids and bases, many substances which contain no active hydrogen can act as acids or acceptors of electron doublets. The basic concept is set forth in the chemical literature (Journal of the Franklin Institute, Vol. 226 - July/Dec. 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical suitable Lewis acids include aluminum fluoride, aluminum bromide, aluminum chloride, antimony pentachloride, zirconium tetrachloride, phosphorus pentachloride, phosphorus pentafluoride, boron fluoride, boron chloride, boron bromide, and arsenic pentafluoride.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such preferable double salt, for example, is that formed by the combination of aluminum chloride and lithium chloride to yield lithium aluminum tetrachloride. Other preferable double salts would be lithium tetrafluoroborate ($LiBF_4$), lithium hexafluoroarsenate, ($LiAsF_6$), lithium hexafluorophosphate ($LiPF_6$) and potassium hexafluoroarsenate ($KAsF_6$).

A main criterion in selecting an ionizable salt is that it be compatible and non-reactive with the crotonitrile, the protective cosolvent and the electrodes of the cell. Likewise, the nonaqueous electrolyte has to be substantially inert with respect to the highly active anode metal while at the same time the anode should not be so completely passivated that when the cell is placed on discharge, delay in the flow of current would result.

Although it should be understood that not all combinations of crotonitrile, protective cosolvent(s) and solutes will function as efficient electrolytes in all anode/cathode cell systems, once the anode and cathode components of a nonaqueous cell are selected, it is within the skill of an artisan to select a suitable protective cosolvent and solute to be used with the crotonitrile of this invention to yield an electrolyte that will function efficiently in a nonaqueous cell system. For example, propylene carbonate is a good protective cosolvent and when added to a 1M solution of $LiClO_4$ with different concentrations of crotonitrile, the conductivity was found to vary as shown in Table 3. This shows that as the concentration of propylene carbonate increases, the conductivity decreases.

TABLE 3

| 1M LiClO$_4$ With | Conductivity (m-mho/cm) |
|---|---|
| 100% CN | 11.36 |
| 10% PC - 90% CN | 10.94 |
| 20% PC - 80% CN | 10.54 |
| 30% PC - 70% CN | 10.13 |

Preferable nonaqueous cell systems according to this invention are shown in Table 4.

TABLE 4

| Anode | Cathode | Crotonitrile Plug | Solute |
|---|---|---|---|
| Li | $(CF_x)_n$ | Propylene Carbonate | LiClO$_4$ or LiAsF$_6$ |
| Li | CuS | Propylene Carbonate | LiClO$_4$ or LiAsF$_6$ |

TABLE 4-continued

| Anode | Cathode | Crotonitrile Plus | Solute |
|---|---|---|---|
| Li | CuO | Propylene Carbonate | $LiClO_4$ or $LiAsF_6$ |
| Li | $(CF_x)_n$ | Ethylene Carbonate | $LiClO_4$ or $LiAsF_6$ |
| Li | CuS | Ethylene Carbonate | $LiClO_4$ or $LiAsF_6$ |
| Li | CuO | Ethylene Carbonate | $LiClO_4$ or $LiAsF_6$ |
| Li | $(CF_x)_n$ | Propylene Glycol Sulfite | $LiClO_4$ or $LiAsF_6$ |
| Li | CuS | Propylene Glycol Sulfite | $LiClO_4$ or $LiAsF_6$ |
| Li | CuO | Propylene Glycol Sulfite | $LiClO_4$ or $LiAsF_6$ |

EXAMPLE I

Nonaqueous button cells having a diameter of 1.7 inches (4.32 cm) and height of 0.36 inch (0.91 cm) were fabricated using either a CuS or $(CF_x)_n$ solid cathode, an electrolyte of 1M solution of $LiClO_4$ in crotonitrile, and a lithium anode. Specifically, each cell was constructed by placing a solid cathode in a nickel container followed by superimposing thereon a separator containing one milliliter of the electrolyte and composed of two layers of fibrous glass and a layer of "Celgard 2400" material, said latter material being a trademark of Celanese Corp. for wettable microrporous polypropylene. A lithium electrode composed of a lithium sheet pressed onto and into an expanded nickel screen was placed on top of the separator followed by a fibrous glass pad, said pad being employed to contain additional electrolyte, if needed. The cell was closed at the top by a nickel lid which was seated upon an annular polypropylene gasket having an L-shaped cross section, which in turn rested on the peripheral surface of the container. A peripheral crimp seal was then made between the lid, gasket and container, thereby sealing the cell.

On different current drains to a specific cutoff voltage, the discharge capacity of the cathode, cathode efficiency and average discharge voltage to cutoff were obtained for each cell and are shown in Table 5. Since the cells were cathode-limited, the cathode efficiency was calculated as a percentage based on the theoretical capacity of the cathode material available in each cell.

For example, the theoretical efficiency of CF ($x = 1$) as a cathode material in a lithium anode cell discharging at a 1 milliampere per square centimeter drain to a 1.5 volt cutoff, is calculated as follows: Assuming the reaction:

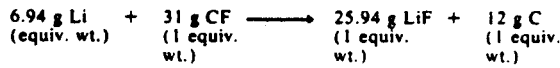

then if 1 gram (g) CF is used the fraction of the equivalent weight is 1/31. Since one Faraday of electricity is obtained from one equivalent weight, then the AH per equivalent weight is calculated as follows:

$$\frac{96,500 \text{ coulombs/Faraday}}{3600 \text{ coulombs/AH}} = 26.8 \text{ AH/equivalent weight.}$$

Therefore, 1/31 equivalent weight × 26.8 AH/equivalent weight = 0.864 AH. This 0.864 AH or 864 mAH is the theoretical capacity of 1 gram of CF material when used as a cathode in a lithium anode cell and, by using this calculation technique, the cathode efficiency of $(CF_x)_n$ material and the other cathode materials can be calculated when such are used as cathodes in cells having various electrolytes.

As shown by the test data in Table 5, the discharge capacity and cathode efficiency of the cells containing crotonitrile as the sole solvent were very low thus demonstrating that crotonitrile would be unacceptable for nonaqueous cell systems if used as the only solvent.

TABLE 5

| Cell Sample | Cathode | Current Drain (mA/cm²) | Cutoff Voltage (Volts) | Theoretical Capacity (mAh) | Discharge Capacity (mAh) | % Eff. | Average Discharge Voltage (Volts) |
|---|---|---|---|---|---|---|---|
| 1 | CuS | 5.0 | 1.0 | 1025.0 | 120 | 11.4 | — |
| 2 | CuS | 5.0 | 1.0 | 1014.0 | 51 | 5.0 | — |
| 3 | CuS | 1.0 | 1.0 | 1008.0 | 212 | 21.0 | 1.6 |
| 4 | CuS | 1.0 | 1.0 | 1014.0 | 251 | 24.7 | 1.6 |
| 5 | CuS | 1.0 | 1.0 | 1014.0 | 310 | 30.5 | 1.8 |
| 6 | CuS | 0.1 | 1.0 | 1014.0 | 82 | 8.1 | 1.8 |
| 7 | CuS | 0.1 | 1.0 | 1014.0 | 68 | 6.7 | 1.8 |
| 8 | CuS | 0.1 | 1.0 | 997.0 | 99 | 9.9 | 1.8 |
| 9 | $(CF_x)_n$ | 5.0 | 1.5 | 738.0 | 427 | 57.8 | 2.0 |
| 10 | $(CF_x)_n$ | 5.0 | 1.5 | 718.3 | 352 | 49.0 | 2.0 |
| 11 | $(CF_x)_n$ | 5.0 | 1.5 | 792.1 | 201 | 25.4 | 1.8 |
| 12 | $(CF_x)_n$ | 1.0 | 1.5 | 733.1 | 486 | 66.3 | 2.1 |
| 13 | $(CF_x)_n$ | 1.0 | 1.5 | 800.3 | 449 | 56.1 | 2.2 |
| 14 | $(CF_x)_n$ | 1.0 | 1.5 | 839.7 | 430 | 51.2 | 2.2 |
| 15 | $(CF_x)_n$ | 0.1 | 1.5 | 813.9 | 231 | 28.4 | 2.3 |
| 16 | $(CF_x)_n$ | 0.1 | 1.5 | 780.6 | 298 | 38.2 | 2.3 |
| 17 | $(CF_x)_n$ | 0.1 | 1.5 | 806.9 | 153 | 19.0 | 2.2 |

EXAMPLE II

Several similar type button cells were produced as described in Example I except that the electrolyte was 1 M solution of $LiClO_4$ with different concentrations of crotonitrile and propylene carbonate. The cathode used in each of these cells was a solid $(CF_x)_n$ cathode wherein the x value varied between 0.85 to 1.0.

On a discharge drain ranging from 0.1 mA/cm² to 5.0 mA/cm² to a 1.5 volt cutoff, the average dischage voltage, cathode efficiency and discharge capacity to cutoff were obtained for each cell and are shown in Table 6. The test data in Table 6 clearly illustrate the high cathode utilization obtainable when using an electrolyte based on crotonitrile in combination with propylene carbonate and $LiClO_4$. The test data also show that the concentration of the propylene carbonate can vary between 10 to 30 volume per cent of the solvent mixture and still provide a good electrolyte for use in nonaqueous lithium cells.

TABLE 6

| Cell Sample | Electrolyte System | Current Drain (mA/cm²) | Theoretical Capacity (mAH) | Discharge Capacity (mAH) | % Eff. | Average Discharge Voltage (Volts) |
|---|---|---|---|---|---|---|
| 1 | 10% PC-90% CN | 5.0 | 656 | 120 | 18.3 | 1.9 |
| 2 | 10% PC-90% CN | 5.0 | 701 | 90 | 12.8 | 2.0 |
| 3 | 10% PC-90% CN | 5.0 | 676 | 200 | 29.5 | 2.0 |
| 4 | 10% PC-90% CN | 1.0 | 781 | 609 | 78.0 | 2.3 |
| 5 | 10% PC-90% CN | 1.0 | 787 | 692 | 87.9 | 2.3 |
| 6 | 10% PC-90% CN | 1.0 | 767 | 703 | 91.6 | 2.3 |
| 7 | 10% PC-90% CN | 0.1 | 761 | 630 | 82.8 | 2.3 |
| 8 | 10% PC-90% CN | 0.1 | 800 | 560 | 70.0 | 2.2 |
| 9 | 10% PC-90% CN | 0.1 | 748 | 440 | 58.8 | 2.6 |
| 10 | 20% PC-80% CN | 1.0 | 827 | 661 | 80.0 | 2.2 |
| 11 | 20% PC-80% CN | 1.0 | 872 | 779 | 89.3 | 2.2 |
| 12 | 20% PC-80% CN | 1.0 | 735 | 531 | 72.3 | 2.1 |
| 13 | 30% PC-70% CN | 1.0 | 781 | 580 | 74.4 | 2.2 |
| 14 | 30% PC-70% CN | 1.0 | 833 | 690 | 82.8 | 2.2 |
| 15 | 30% PC-70% CN | 1.0 | 807 | 540 | 66.9 | 2.3 |

EXAMPLE III

Several similar type button cells were produced as described in Example I except that different cathodes were used along with different concentrations of crotonitrile and propylene carbonate in the LiClO₄ electrolyte solution.

The discharge capacity, average discharge voltage and cathode efficiency were obtained for each cell using a 1 mA/cm² drain to a specific cutoff voltage as shown in Table 7. As is known in the art, CuS cells will discharge in two steps and thus the data obtained for the CuS cells reflect the two-step discharge.

As demonstrated from the data in Table 7, crotonitrile in combination with propylene carbonate and an ionizable solute produces an electrolyte admirably suited for use in nonaqueous cells employing highly active metal anodes.

Cathode efficiencies of slightly over 100% for the NiF₂ cathode cells are believed to be within the limits of experimental error and are not believed to be significant.

TABLE 7

1M LiClO₄ - Various Cathodes - Discharge Rate 1.0 mA/cm²

| Cell Sample | System | Theoretical Capacity (mAH) | Discharge Capacity (mAH) | % Efficiency | Average Discharge Voltages (Volts) 1st Step | 2nd Step |
|---|---|---|---|---|---|---|
| 1 | CuS | 1008 | 680 | 67.5 | 1.9 | 1.0 |
| 2 | 10% PC-90% CN 2-Step Discharge | 1008 | 780 | 77.3 | 1.9 | 1.3 |
| 3 | 0.5 Volt Cutoff | 1008 | 790 | 78.3 | 1.9 | 1.2 |
| 4 | AgCl | 826 | 580 | 70.2 | 2.6 | |
| 5 | 10% PC-90% CN 1-Step Discharge | 809 | 565 | 69.8 | 2.6 | |
| 6 | 1.5 Volts Cutoff | 843 | 575 | 68.2 | 2.6 | |
| 7 | AgCl | 826 | 583 | 70.6 | 2.6 | |
| 8 | 5% PC-95% CN 1-Step Discharge | 809 | 586 | 72.4 | 2.6 | |
| 9 | 1.5 Volts Cutoff | 809 | 572 | 70.7 | 2.6 | |
| 10 | CuO | 715 | 350 | 49.0 | 1.0 | |
| 11 | 10% PC-90% CN 1-Step Discharge | 703 | 430 | 61.0 | 1.0 | |
| 12 | 0.6 Volt Cutoff | 704 | 360 | 51.0 | 0.9 | |
| 13 | NiF₂ | 643 | 668 | 104.0 | 1.42 | |
| 14 | 10% PC-90% CN 1-Step Discharge 1.0 Volt Cutoff | 678 | 684 | 104.0 | 1.42 | |

While the present invention has been described with reference to many particular details thereof, it is not intended that these details shall be construed as limiting the scope of this invention.

What is claimed is:

1. A nonaqueous cell comprising a highly active metal anode selected from the group consisting of lithium, sodium, potassium, calcium, magnesium and their alloys, a solid cathode and a nonaqueous electrolyte comprising crotonitrile, at least one cosolvent selected from the group consisting of propylene carbonate, ethylene carbonate, γ-butyrolactone, nitrobenzene, methyl acetate, sulfolane, 3-methyl sulfolane, methyl formate, dimethyl sulfoxide, propylene glycol sulfite and diethyl sulfite, and an ionizable solute.

2. The nonaqueous cell of claim 1 wherein said cosolvent is propylene carbonate.

3. The nonaqueous cell of claim 1 wherein the solid cathode is selected from the group consisting of $(CF_x)_n$, copper sulfide, nickel fluoride, copper oxide, manganese dioxide, lead dioxide, iron sulfide, copper chloride, silver chloride and sulfur.

4. The nonaqueous cell of claim 1 wherein said electrolyte contains a low viscosity cosolvent selected from the group consisting of tetrahydrofuran, dioxolane, dimethoxyethane, dimethyl isoxazole and dioxane.

5. The nonaqueous cell of claim 1 wherein the solute is selected from the group consisting of lithium aluminum tetrachloride, lithium tetrafluoroborate, lithium hexafluoroarsenate, lithium hexafluorophosphate, potassium hexafluoroarsenate and lithium perchlorate.

6. The nonaqueous cell of claim 1 wherein said anode is lithium, said cathode is $(CF_x)_n$ and said cosolvent is propylene carbonate.

7. The nonaqueous cell of claim 1 wherein said anode is lithium, said cathode is copper sulfide and said cosol- 8. The nonaqueous cell of claim 1 wherein said anode is lithium, said cathode is nickel fluoride and said cosolvent is propylene carbonate.

9. The nonaqueous cell of claim 1 wherein said anode is lithium, said cathode is copper oxide and said cosolvent is propylene carbonate.

10. The nonaqueous cell of claim 1 wherein said anode is lithium, said cathode is silver chloride and said cosolvent is propylene carbonate.

* * * * *